(12) United States Patent
Inda et al.

(10) Patent No.: US 11,529,861 B2
(45) Date of Patent: Dec. 20, 2022

(54) VEHICLE DRIVE SYSTEM

(71) Applicant: AISIN CORPORATION, Aichi (JP)

(72) Inventors: Keita Inda, Kariya (JP); Kohei Ono, Kariya (JP); Tetsuro Kobayashi, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/294,898

(22) PCT Filed: Jan. 17, 2020

(86) PCT No.: PCT/JP2020/001586
§ 371 (c)(1),
(2) Date: May 18, 2021

(87) PCT Pub. No.: WO2020/149412
PCT Pub. Date: Jul. 23, 2020

(65) Prior Publication Data
US 2022/0016968 A1 Jan. 20, 2022

(30) Foreign Application Priority Data
Jan. 17, 2019 (JP) .............................. JP2019-006154

(51) Int. Cl.
| | |
|---|---|
| *B60K 6/405* | (2007.10) |
| *B60K 6/365* | (2007.10) |
| *B60K 6/48* | (2007.10) |
| *F16H 57/04* | (2010.01) |
| *H02K 7/00* | (2006.01) |

(52) U.S. Cl.
CPC .............. *B60K 6/405* (2013.01); *B60K 6/365* (2013.01); *B60K 6/48* (2013.01); *F16H 57/0401* (2013.01); *F16H 57/043* (2013.01); *H02K 7/006* (2013.01); *B60K 2006/4808* (2013.01); *B60K 2006/4825* (2013.01); *B60K 2006/4833* (2013.01)

(58) Field of Classification Search
None
See application file for complete search history.

(56) References Cited

U.S. PATENT DOCUMENTS

| | | | |
|---|---|---|---|
| 6,533,692 B1 * | 3/2003 | Bowen .................... | B60K 23/08 903/952 |
| 6,589,128 B2 * | 7/2003 | Bowen ............... | B60K 23/0808 903/910 |

(Continued)

FOREIGN PATENT DOCUMENTS

| | | |
|---|---|---|
| JP | H11-348586 A | 12/1999 |
| JP | 2017-13707 A | 1/2017 |

(Continued)

OTHER PUBLICATIONS

IPR PCT/JP2020/001586 (dated 2021).*

(Continued)

*Primary Examiner* — Dirk Wright
(74) *Attorney, Agent, or Firm* — Oliff PLC (57) ABSTRACT

A transfer is located on an axial first side that is one side in axial direction relative to a transmission, and a rotating electric machine is located coaxially with a transmission output member, between the transmission and the transfer in the axial direction.

8 Claims, 3 Drawing Sheets

(56) References Cited

U.S. PATENT DOCUMENTS

| | | | | |
|---|---|---|---|---|
| 6,679,799 | B2* | 1/2004 | Bowen | B60W 10/02 |
| | | | | 903/910 |
| 6,719,656 | B2* | 4/2004 | Bowen | B60K 6/365 |
| | | | | 903/952 |
| 6,881,168 | B2* | 4/2005 | Bowen | B60K 6/365 |
| | | | | 903/910 |
| 7,424,924 | B2* | 9/2008 | Janson | B60K 6/365 |
| | | | | 475/5 |
| 7,455,135 | B2* | 11/2008 | Janson | B60K 6/48 |
| | | | | 180/65.6 |
| 8,888,638 | B2* | 11/2014 | Mueller | B60K 6/48 |
| | | | | 475/5 |
| 2003/0085062 | A1 | 5/2003 | Bowen | |
| 2008/0202829 | A1 | 8/2008 | Gelinas | |
| 2014/0007740 | A1* | 1/2014 | Takahashi | B60W 10/06 |
| | | | | 903/902 |

FOREIGN PATENT DOCUMENTS

| | | | | |
|---|---|---|---|---|
| JP | 2017-177964 A | 10/2017 | | |
| JP | 2018-182924 A | 11/2018 | | |
| WO | WO-2010141682 A1 * | 12/2010 | ......... | B60K 17/3462 |
| WO | 2014/091587 A1 | 6/2014 | | |
| WO | WO-2014091587 A1 * | 6/2014 | ............... | B60K 6/48 |

OTHER PUBLICATIONS

ISR PCT/JP2020/001586 (dated 2021).*
OA JP 2020-566509 (dated 2021).*
Mar. 24, 2020 International Search Report issued in International Patent Application No. PCT/JP2020/001586.
Jul. 23, 2021 Extended European Search Report issued in European Patent Application No. 20741064.8.

* cited by examiner

Fig.1

Fig.2

VEHICLE DRIVE SYSTEM

TECHNICAL FIELD

The present disclosure relates to a vehicle drive system that is provided with an input member drivingly coupled to an internal combustion engine, a transmission, a rotating electric machine, a transfer, and a case.

BACKGROUND ART

One example of a vehicle drive system like that described above is disclosed in U.S. Patent Application Publication No. 2008/0202829 (Patent Document 1). Reference signs in parentheses shown hereafter in the description of the background art section are those used in Patent Document 1. In a drivetrain (130) as a vehicle drive system, illustrated in FIG. 5 to FIG. 7 of Patent Document 1, an electric drive unit (34) as a rotating electric machine, and a transfer (74) are located coaxially with a transmission (32). Further, the transfer (74) is located axially between the transmission (32) and the electric drive unit (34).

RELATED ART DOCUMENTS

Patent Documents

Patent Document 1: U.S. Patent Application Publication No. 2008/0202829

SUMMARY OF THE DISCLOSURE

Problem to be Solved by the Disclosure

Incidentally, in vehicle drive systems as described above, there are some instances where oil in a case is used not only for lubrication and operation of a transmission, but also for lubrication and cooling of a rotating electric machine. In the light of reductions in size and cost of the entire system, it is preferable that a structure for supplying oil to the transmission and the rotating electric machine in such instances be as simple as possible. Unfortunately, Patent Document 1 does not describe this issue.

Therefore, there is a need to provide a technique that easily enables the simplification of a structure for supplying oil to a transmission and a rotating electric machine.

Means for Solving the Problem

A vehicle drive system according to the present disclosure is provided with: an input member drivingly coupled to an internal combustion engine; a transmission that changes a speed of rotation transmitted from the input member and that then transmits the rotation to a transmission output member; a rotating electric machine drivingly coupled to the transmission output member; a first output member drivingly coupled to a rear wheel; a second output member drivingly coupled to a front wheel; a transfer that distributes the rotation transmitted from the transmission output member between the first output member and the second output member, and a case that houses the transmission, the rotating electric machine, and the transfer. The transfer is located on an axial first side relative to the transmission. The axial first side is one side in an axial direction. The rotating electric machine is located coaxially with the transmission output member, between the transmission and the transfer in the axial direction.

This structure enables the rotating electric machine to be located close to the transmission, compared with when the rotating electric machine is located on the axial first side relative to the transfer. Thus, when components that are needed to supply oil, such as a hydraulic pump and an oil storing portion, are shared at least in part between the transmission and the rotating electric machine and oil in the case is shared between the transmission and the rotating electric machine, it is possible to easily simplify the structure of an oil passage, for example, it is possible to easily keep the oil passage to a short length. Therefore, it is possible to easily simplify a structure for supplying oil to the transmission and the rotating electric machine.

Further features and advantages of the vehicle drive system will be apparent from the following description of embodiments in conjunction with the drawings.

MODES FOR CARRYING OUT THE DISCLOSURE

An embodiment of a vehicle drive system is described with reference to the drawings. In the description below, unless otherwise specified, the terms "axial direction L", "radial direction R", and "circumferential direction" are defined with respect to a rotation axis center A (refer to FIG. 3) of a transmission output member 23 that is described later. The transmission output member 23 and a rotating member that is located coaxially with the transmission output member 23 rotate about the rotation axis center A. Further, one side in the axial direction L is defined as an "axial first side L1", and the other side in the axial direction L (a side opposite to the axial first side L1 in the axial direction L) is defined as an "axial second side L2". Furthermore, an outer side in the radial direction R is defined as a "radially outer side R1", and an inner side in the radial direction R is defined as a "radially inner side R2" (refer to FIG. 3). Directions used for members described below refer to the directions after the members are assembled in a vehicle drive system 1. Further, terms related to the dimensions, orientations, and locations of the members are used as a concept that allow for differences due to tolerances (permissible manufacturing tolerances).

In the present description, "drivingly coupled" refers to a situation where two rotating elements are coupled together such that driving power (synonymous with torque) is transmittable therebetween. This includes a situation where the two rotating elements are coupled in such a manner as to rotate as a unit with each other, or a situation where the two rotating elements are coupled via one or two or more transmission members such that driving power is transmittable therebetween. Various types of members (e.g., a shaft, a gear mechanism, a belt, and a chain) that transmit rotation while maintaining or changing the rotational speed are included as the transmission member. Further, an engagement device (e.g., a friction engagement device and an intermesh engagement device) that selectively transmits rotation and driving power may be included as the transmission member.

Furthermore, in the present description, a "rotating electric machine" is used as a concept including a motor (an electric motor), a generator (an alternator), and a motor-generator that serves as either a motor or a generator as needed. Moreover, in the present description, the expression "overlap in a specific direction view" used to describe an arrangement of two members means that when an imaginary straight line parallel to the direction of view is moved to directions perpendicular to the imaginary straight line, the imaginary straight line overlaps both of the two members at least somewhere. In addition, in the present description, the expression "arrangement areas in a specific direction overlap" used to describe an arrangement of two members means that an arrangement area of one member in a specific direction is at least partially included in an arrangement area of the other member in the specific direction.

Figure 1:
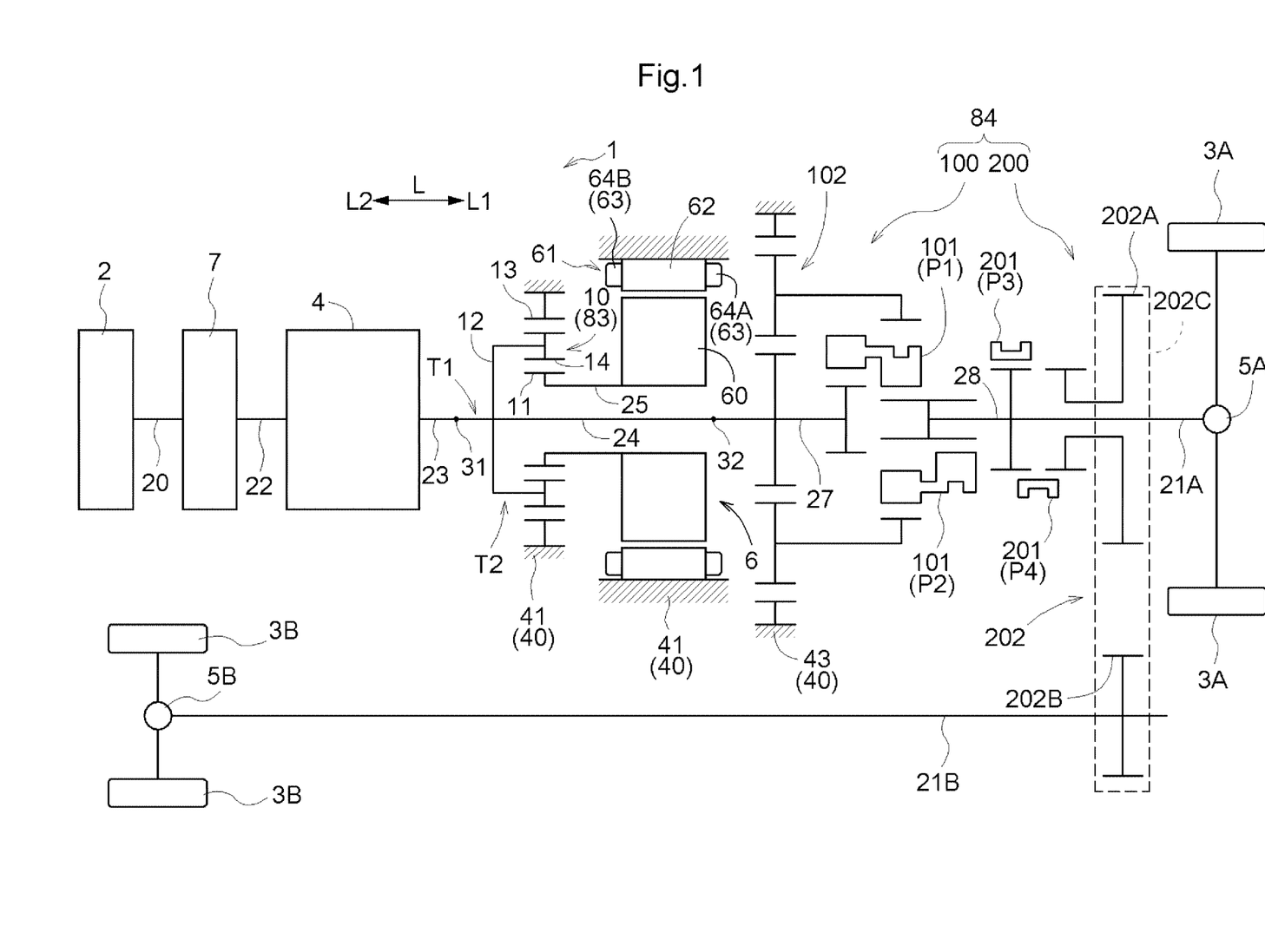
FIG. 1 is a schematic diagram illustrating a simplified structure of a vehicle drive system.
Figure 2:
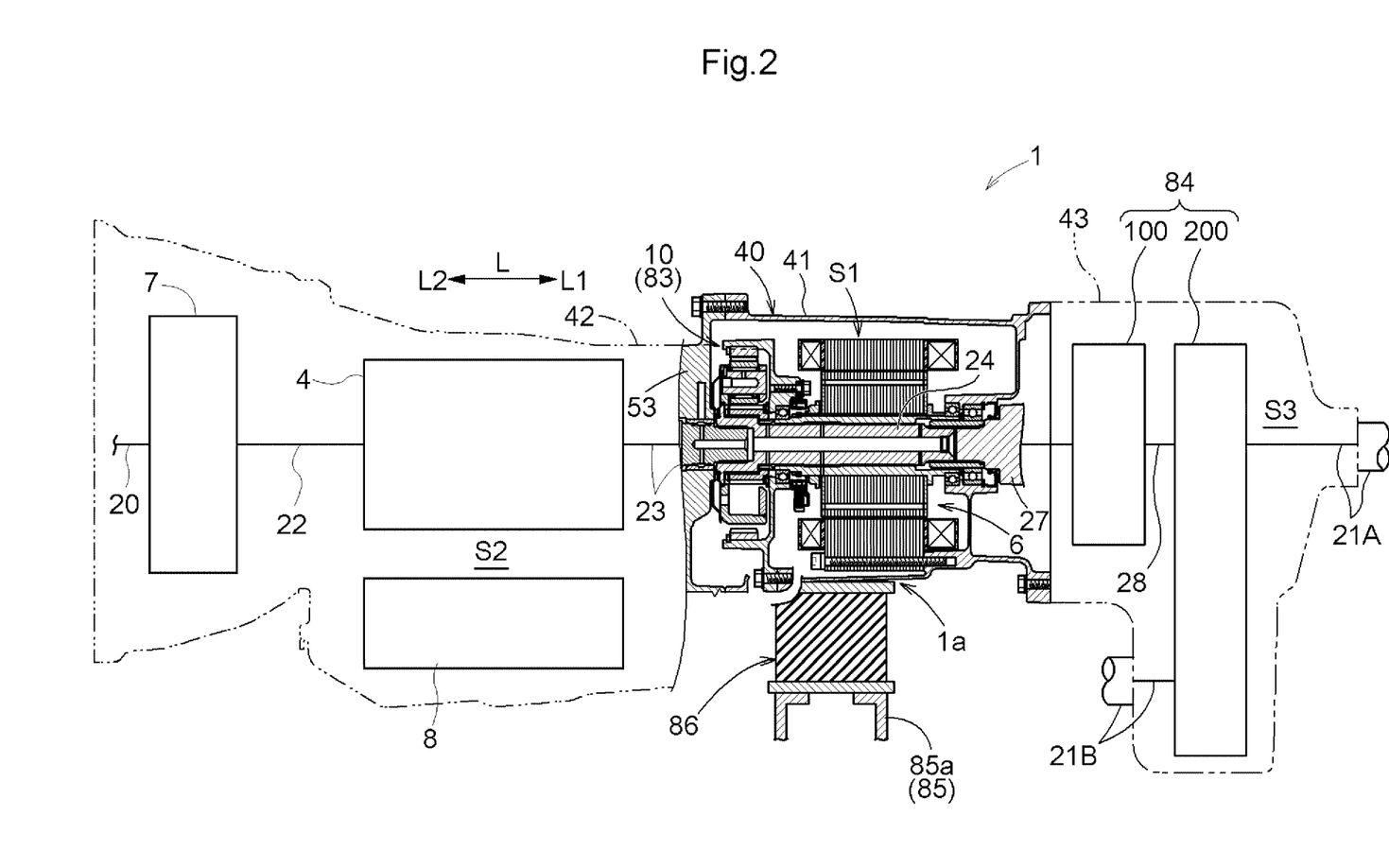
FIG. 2 is a cross-sectional view illustrating the vehicle drive system in a partially simplified form.

As illustrated in FIG. 1 and FIG. 2, the vehicle drive system 1 includes: an input member 20 drivingly coupled to an internal combustion engine 2; a transmission 4; a rotating electric machine 6; a first output member 21A drivingly coupled to rear wheels 3A; a second output member 21B drivingly coupled to front wheels 3B; a transfer 84, and a case 40. The vehicle drive system 1 transmits an output torque of one or both of the internal combustion engine 2 and the rotating electric machine 6 to one or both of the first output member 21A and the second output member 21B (i.e., transmits the output torque to either or both of the rear wheels 3A and the front wheels 3B), thereby propelling a vehicle.

As illustrated in FIG. 1, according to the present embodiment, the first output member 21A is drivingly coupled via a rear differential gear mechanism 5A to the two right and left rear wheels 3A, and the second output member 21B is drivingly coupled via a front differential gear mechanism 5B to the two right and left front wheels 3B. That is, according to the present embodiment, the vehicle drive system 1 is structured as a four-wheel drive system that drives four wheels (the two right and left rear wheels 3A and the two right and left front wheels 3B). The first output member 21A is coupled to the rear differential gear mechanism 5A via, for example, a flexible coupling or a propeller shaft. The second output member 21B is coupled to the front differential gear mechanism 5B via, for example, a flexible coupling or a propeller shaft. The rear differential gear mechanism 5A distributes driving power transmitted from the first output member 21A to the two right and left rear wheels 3A. The front differential gear mechanism 5B distributes driving power transmitted from the second output member 21B to the two right and left front wheels 3B. The rear differential gear mechanism 5A and the front differential gear mechanism 5B may be, for example, differential gear mechanisms of bevel gear type or planetary gear type.

The input member 20 is drivingly coupled to an output member (a crankshaft or the like) of the internal combustion engine 2. The input member 20 is coupled, for example, in such a manner as to rotate as a unit with the output member of the internal combustion engine 2. According to the present embodiment, the input member 20 is located on the axial second side L2 relative to the transmission output member 23 and is located coaxially with the transmission output member 23. The internal combustion engine 2 is a motor (e.g., a gasoline engine or a diesel engine) that generates power by being driven by the combustion of a fuel in the engine.

The transmission 4 changes the speed of rotation transmitted from the input member 20 and then transmits the rotation to the transmission output member 23. Specifically, the transmission 4 changes the speed of rotation transmitted from the input member 20 to a transmission input member 22 and then transmits the rotation to the transmission output member 23. The transmission input member 22 is a member to input rotation from the input member 20 to the transmission 4, and the transmission output member 23 is a member to output rotation from the transmission 4 to the transfer 84. According to the present embodiment, the transmission input member 22 is located on the axial second side L2 relative to the transmission output member 23 and is located coaxially with the transmission output member 23. The transmission 4 is structured to be capable of stepwise or continuously changing a speed ratio that is the ratio of a rotational speed of the transmission input member 22 to a rotational speed of the transmission output member 23. The transmission 4 changes the speed of rotation of the transmission input member 22 at the current speed ratio and then transmits the rotation to the transmission output member 23.

According to the present embodiment, the transmission 4 is structured to be capable of changing the speed ratio in accordance with a hydraulic pressure that is supplied from a hydraulic control device 8 (refer to FIG. 2). For this reason, the transmission 4 is provided with, for example, a hydraulically-driven engagement device for shifting. Although details are omitted here, the vehicle drive system 1 is provided with a hydraulic pump that generates a hydraulic pressure by suctioning oil from an oil storing portion (an oil pan or the like). The hydraulic control device 8 controls the hydraulic pressure of the oil discharged from the hydraulic pump and then supplies the oil to each component of the vehicle drive system 1. According to the present embodiment, the oil supplied to the transmission 4 is used for lubrication and operation of the transmission 4, and the oil supplied to the rotating electric machine 6 is used for lubrication and cooling of the rotating electric machine 6. It is noted that the hydraulic pump is driven by, for example, rotation of the input member 20 or the transmission input member 22. The oil storing portion is provided, for example, under a second case portion 42 that is described later.

According to the present embodiment, a torque converter 7 (one example of a fluid coupling) is provided in a power transmission path between the input member 20 and the transmission input member 22. Alternatively, a damper in addition to or instead of the torque converter 7 may be provided in the power transmission path between the input member 20 and the transmission input member 22. Further alternatively, the torque converter 7 may not be provided in the power transmission path between the input member 20 and the transmission input member 22 so that the input member 20 and the transmission input member 22 can be coupled together in such a manner as to rotate as a unit with each other, or the input member 20 and the transmission input member 22 may be formed as one piece with each other (that is, the input member 20 may serve as a transmission input member). Further alternatively, for example, a second rotating electric machine that serves as a driving power source for the wheels may be provided in addition to the rotating electric machine 6, and a power distribution mechanism (a planetary gear mechanism or the like) that distributes torque transmitted from the input member 20 between the second rotating electric machine and the transmission input member 22 may be provided in the power transmission path between the input member 20 and the transmission input member 22. When the torque converter 7 is provided in the power transmission path between the input member 20 and the transmission input member 22, the power distribution mechanism is provided, for example, in a power transmission path between the torque converter 7 and the transmission input member 22.

The rotating electric machine 6 is provided with a stator 61 that is fixed to the case 40 (specifically, a first case portion 41 that is described later), and a rotor 60 that is rotatably supported with respect to the stator 61. The stator 61 is provided with a stator core 62 and a coil 63 that is wound on the stator core 62. The stator 61 is provided with a first coil end portion 64A protruding from the stator core 62 toward the axial first side L1, and a second coil end portion 64B protruding from the stator core 62 toward the axial second side L2. A portion of the coil 63 that protrudes from the stator core 62 toward the axial first side L1 forms the first coil end portion 64A, and a portion of the coil 63 that protrudes from the stator core 62 toward the axial second side L2 forms the second coil end portion 64B. According to the present embodiment, the rotating electric machine 6 is an inner-rotor-type rotating electric machine, and the rotor 60 is located on the radially inner side R2 relative to the stator 61 and at a location that overlaps the stator 61 in a radial view that is along the radial direction R. The rotor 60 is coupled in such a manner as to rotate as a unit with a rotor shaft 25. The rotor shaft 25 is formed in a tubular shape (specifically, a cylindrical shape) extending in the axial direction L. The rotor shaft 25 extends through the radially inner side R2 of the rotor 60 in the axial direction L, and the rotor 60 is fixed to the outer circumferential surface of the rotor shaft 25.

The rotating electric machine 6 is drivingly coupled to the transmission output member 23. According to the present embodiment, driving power of the rotating electric machine 6 is transmitted to an intermediate member 24 that is provided in the power transmission path between the transmission output member 23 and the transfer 84. In other words, output torque of the rotating electric machine 6 is transmitted through a second power transmission path T2 to the intermediate member 24 provided in a first power transmission path T1 that connects the input member 20 and the transfer 84. The second power transmission path T2 is a power transmission path that connects the rotating electric machine 6 and the intermediate member 24. The output torque of the rotating electric machine 6 is transmitted to the transfer 84 through the second power transmission path T2 and a portion of the first power transmission path T1 that connects the intermediate member 24 and the transfer 84. The intermediate member 24 is located closer to the transfer 84 than the transmission output member 23 in the first power transmission path T1, and the transfer 84 is coupled to the transmission output member 23 via the intermediate member 24. According to the present embodiment, the intermediate member 24 is a shaft member and is formed in a tubular shape (specifically, a cylindrical shape) extending in the axial direction L. According to the present embodiment, the intermediate member 24 is coupled in such a manner as to rotate as a unit with the transmission output member 23 and is also coupled in such a manner as to rotate as a unit with the transfer 84 (specifically, a transfer input member 27 that is an input member of the transfer 84). That is, the intermediate member 24 couples the transmission output member 23 and the transfer 84 (specifically, the transfer input member 27) together such that the transmission output member 23 and the transfer 84 rotate as a unit with each other.

Figure 3:
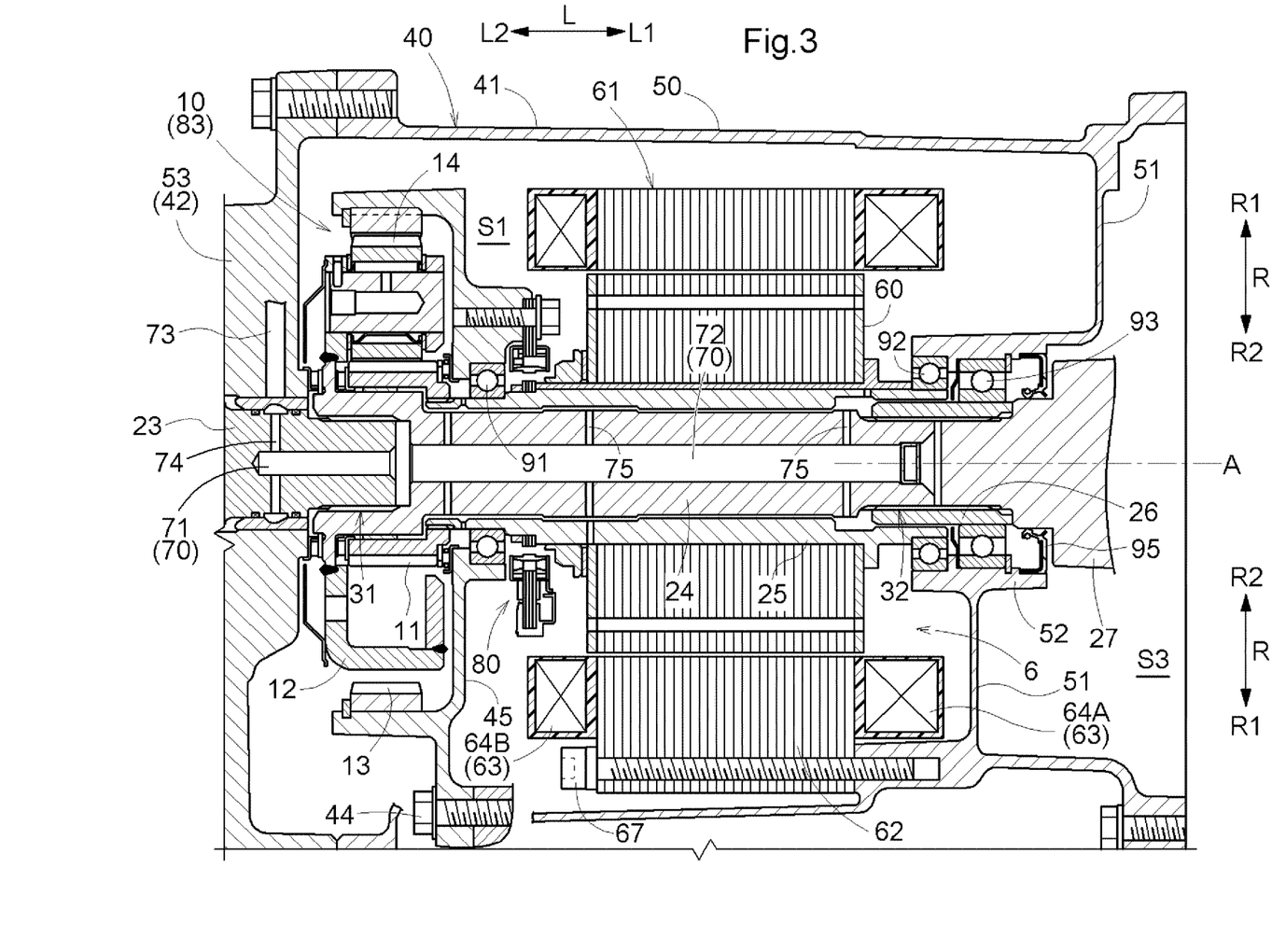
FIG. 3 is a partially enlarged view of FIG. 2.

In the example illustrated in FIG. 3, at a first coupling portion 31 that is a portion coupling the intermediate member 24 and the transmission output member 23, spline teeth that are formed in the inner circumferential surface of an end portion of the intermediate member 24 on the axial second side L2 are spline-engaged with spline teeth that are formed in the outer circumferential surface of an end portion of the transmission output member 23 on the axial first side L1. Further, in the example illustrated in FIG. 3, at a second coupling portion 32 that is a portion coupling the intermediate member 24 and the transfer input member 27, spline teeth that are formed in the outer circumferential surface of an end portion of the intermediate member 24 on the axial first side L1 are spline-engaged with spline teeth that are formed in the inner circumferential surface of a portion of a coupling member 26 on the axial second side L2, and spline teeth that are formed in the outer circumferential surface of an end portion of the transfer input member 27 on the axial second side L2 are spline-engaged with spline teeth that are formed in the inner circumferential surface of a portion of the coupling member 26 on the axial first side L1. That is, in the example illustrated in FIG. 3, the intermediate member 24 is coupled via the coupling member 26 to the transfer input member 27.

The transfer 84 distributes rotation transmitted from the transmission output member 23 between the first output member 21A and the second output member 21B. Specifically, the transfer 84 is provided with a distribution portion 200 that distributes the rotation transmitted from the transmission output member 23 between the first output member 21A and the second output member 21B. The expression "distribute rotation between the first output member 21A and the second output member 21B" herein is used as a concept including a situation where the distribution ratio for one of the first output member 21A and the second output member 21B is 100 [%] while the distribution ratio for the other of the first output member 21A and the second output member 21B is 0 [%]. Any type of distribution portion, including a part-time type, a full-time type, and a combination of these types, can be employed as the distribution portion 200. That is, the distribution portion 200 may be provided with a mechanism (a center differential mechanism, a limited slip differential mechanism, etc.) that is not illustrated in FIG. 1.

In the example illustrated in FIG. 1, a part-time type distribution portion is employed as the distribution portion 200. That is, the distribution portion 200 illustrated in FIG. 1 is structured to perform switching between a two-wheel-drive mode that drives either the rear wheels 3A or the front wheels 3B (here, only the rear wheels 3A), and a four-wheel-drive mode that drives both the rear wheels 3A and the front wheels 3B. Specifically, the distribution portion 200 illustrated in FIG. 1 is provided with a second sleeve member 201 that is movable in the axial direction L, and a wrapping transfer mechanism 202. The wrapping transfer mechanism 202 is provided with: a first rotating body 202A (e.g., a sprocket); a second rotating body 202B (e.g., a sprocket) that is located non-coaxially with the first rotating body 202A, and a transfer member 202C (e.g., a chain) that is wrapped around both the first rotating body 202A and the second rotating body 202B. In the example illustrated in FIG. 1, rotation of the transfer input member 27 is transmitted to a transfer intermediate member 28 after the speed of the rotation is changed by a speed change portion 100 that is described later, and then the distribution portion 200 distributes rotation of the transfer intermediate member 28 between the first output member 21A and the second output member 21B. In the example illustrated in FIG. 1, the transfer intermediate member 28 is coupled in such a manner as to rotate as a unit with the first output member 21A.

As illustrated in FIG. 1, in a state where the second sleeve member 201 is at a two-wheel-drive position P3, the first rotating body 202A is decoupled from the transfer intermediate member 28 (in other words, the coupling to the transfer intermediate member 28 is released). On the other hand, in a state where the second sleeve member 201 is at a four-wheel-drive position P4, the first rotating body 202A is coupled to the transfer intermediate member 28 (here, coupled in such a manner as to rotate as a unit), and the transfer intermediate member 28 is coupled via the wrapping transfer mechanism 202 to the second output member 21B. The second rotating body 202B is coupled in such a manner as to rotate as a unit with the second output member 21B. Thus, the two-wheel-drive mode is established in the state where the second sleeve member 201 is at the two-wheel-drive position P3, and the four-wheel-drive mode is established in the state where the second sleeve member 201 is at the four-wheel-drive position P4.

According to the present embodiment, the transfer 84 is structured to be capable of stepwise changing a ratio between the speed of rotation that is transmitted from the transmission output member 23 and the speed of rotation that is distributed between the first output member 21A and the second output member 21B. This ratio may be, for example, a ratio of the rotational speed of the transfer input member 27 to the rotational speed of the first output member 21A. In the example illustrated in FIG. 1, the transfer 84 is provided with the speed change portion 100 (an auxiliary transmission) in a power transmission path between the transfer input member 27 and the distribution portion 200. The speed change portion 100 changes the speed of rotation of the transfer input member 27 and then transmits the rotation to the transfer intermediate member 28. For this reason, the above ratio may be a ratio of the rotational speed of the transfer input member 27 to the rotational speed of the transfer intermediate member 28. In this way, according to the present embodiment, the transfer 84 has a structure in which the speed change portion 100 and the distribution portion 200 are coupled in series with each other. Alternatively, the transfer 84 may be structured to have a mechanism that is a combination of the speed change portion 100 and the distribution portion 200.

In the example illustrated in FIG. 1, the speed change portion 100 is provided with a first sleeve member 101 that is movable in the axial direction L, and a speed change mechanism 102 that is capable of changing the speed ratio in accordance with the position of the first sleeve member 101 in the axial direction L. The speed change mechanism 102 is structured using a single-pinion-type planetary gear mechanism that is provided with a sun gear that is coupled to the transfer input member 27, a carrier, and a ring gear that is fixed to the case 40 (specifically, a third case portion 43 that is described later). Further, as illustrated in FIG. 1, in a state where the first sleeve member 101 is at a first position P1, the sun gear of the planetary gear mechanism that structures the speed change mechanism 102 is coupled in such a manner as to rotate as a unit with the transfer intermediate member 28, and in a state where the first sleeve member 101 is at a second positon P2, the carrier of the planetary gear mechanism that structures the speed change mechanism 102 is coupled in such a manner as to rotate as a unit with the transfer intermediate member 28. Consequently, in the state where the first sleeve member 101 is at the first position P1, the rotation of the transfer input member 27 is transmitted to the transfer intermediate member 28 while the rotational speed remains unchanged, and in the state where the first sleeve member 101 is at the second positon P2, the rotation of the transfer input member 27 is decelerated and then the decelerated rotation is transmitted to the transfer intermediate member 28.

Thus, in the example illustrated in FIG. 1, the transfer 84 is structured to switch a power transmission state in the transfer 84 between one state (a high gear state) where a ratio of the rotational speed of the transfer input member 27 to the rotational speed of the transfer intermediate member 28 (or a ratio of the rotational speed of the transfer input member 27 to the rotational speed of the first output member 21A) is relatively small and another state (a low gear state) where the ratio is relatively large.

The transfer 84 is located on the axial first side L1 relative to the transmission 4. The transfer input member 27 is located coaxially with the transmission output member 23, on the axial first side L1 relative to the transmission 4. Further, the rotating electric machine 6 is located coaxially with the transmission output member 23, between the transmission 4 and the transfer 84 in the axial direction L. The intermediate member 24 is located coaxially with the transmission output member 23, on the axial first side L1 relative to the transmission 4. According to the present embodiment, as illustrated in FIG. 3, the outer circumferential surface of the intermediate member 24 is formed to be smaller in diameter than the inner circumferential surface of the rotor shaft 25, and the intermediate member 24 is located on the radially inner side R2 relative to the rotor shaft 25 and at a location that overlaps the rotor shaft 25 in the radial view. It is noted that according to the present embodiment, the vehicle drive system 1 is mounted on a vehicle such that the axial second side L2 is directed toward the front of the vehicle body.

According to the present embodiment, the vehicle drive system 1 is provided with a speed reducer 83 that decelerates rotation transmitted from the rotating electric machine 6 and that transmits the decelerated rotation toward the transmission output member 23. The speed reducer 83 is provided in the second power transmission path T2. The speed reducer 83 decelerates rotation transmitted from the rotating electric machine 6 and transmits the decelerated rotation toward the intermediate member 24. According to the present embodiment, the speed reducer 83 is located coaxially with the transmission output member 23, between the transmission 4 and the rotating electric machine 6 in the axial direction L. According to the present embodiment, no speed change mechanism other than the speed reducer 83 is provided in the second power transmission path T2, so that rotation of the rotating electric machine 6 is decelerated in accordance with a gear ratio of the speed reducer 83, and the decelerated rotation is then transmitted to the intermediate member 24. Further, according to the present embodiment, no engagement device that selectively couples the rotating electric machine 6 and the intermediate member 24 is provided in the second power transmission path T2, so that the rotating electric machine 6 rotates in continuous synchronization with the intermediate member 24.

According to the present embodiment, the speed reducer 83 is structured using a planetary gear mechanism 10 that is provided with a sun gear 11 coupled to the rotating electric machine 6, a carrier 12 coupled to the intermediate member 24, and a ring gear 13 fixed to the case 40 (specifically, the first case portion 41 that is described later). The carrier 12 supports a pinion gear 14 that meshes with both the sun gear 11 and the ring gear 13 such that a pinion gear 14 is rotatable. According to the present embodiment, the sun gear 11 is coupled in such a manner as to rotate as a unit with the rotating electric machine 6, and the carrier 12 is coupled in such a manner as to rotate as a unit with the intermediate member 24. Further, the planetary gear mechanism 10 is a single-pinion-type planetary gear mechanism. Thus, rotation inputted from the rotating electric machine 6 to the sun gear 11 is decelerated in accordance with a gear ratio of the planetary gear mechanism 10, and the decelerated rotation is then outputted from the carrier 12 to the intermediate member 24.

The case 40 houses the transmission 4, the rotating electric machine 6, and the transfer 84. Specifically, the case 40 is provided with a transmission accommodation chamber S2 that houses the transmission 4, and a rotating-electric-machine accommodation chamber S1 that houses the rotating electric machine 6. The case 40 is further provided with a transfer accommodation chamber S3 that houses the transfer 84. According to the present embodiment, the transmission accommodation chamber S2 and the rotating-electric-machine accommodation chamber S1 are located adjacent to each other in the axial direction L. Specifically, the rotating-electric-machine accommodation chamber S1 is located adjacent to the transmission accommodation chamber S2, on the axial first side L1 relative to the transmission accommodation chamber S2. Further, according to the present embodiment, the rotating-electric-machine accommodation chamber S1 and the transfer accommodation chamber S3 are located adjacent to each other in the axial direction L. Specifically, the rotating-electric-machine accommodation chamber S1 is located adjacent to the transfer accommodation chamber S3 on the axial second side L2.

As illustrated in FIG. 2, the case 40 is provided with the first case portion 41 that supports the rotating electric machine 6 and the intermediate member 24, and the second case portion 42 that supports the transmission 4 and the transmission output member 23. According to the present embodiment, the first case portion 41 further supports the speed reducer 83 (the planetary gear mechanism 10). The first case portion 41 is joined to the axial first side L1 of the second case portion 42. The first case portion 41 and the second case portion 42 are jointed together, for example, by using a fastening bolt. Further, the intermediate member 24 is coupled to the transmission output member 23 while the first case portion 41 is joined to the axial first side L1 of the second case portion 42. As illustrated in FIG. 2, according to the present embodiment, the case 40 is further provided with the third case portion 43 that supports the transfer 84. The third case portion 43 is joined to the axial first side L1 of the first case portion 41. The first case portion 41 and the third case portion 43 are jointed together, for example, by using a fastening bolt. Further, the intermediate member 24 is coupled to the transfer input member 27 while the third case portion 43 is joined to the axial first side L1 of the first case portion 41.

As illustrated in FIG. 2 and FIG. 3, the case 40 is provided with an end wall portion 53 that is located on the axial first side L1 relative to the transmission 4. The end wall portion 53 separates the rotating-electric-machine accommodation chamber S1 and the transmission accommodation chamber S2 from each other in the axial direction L. According to the present embodiment, the end wall portion 53 is provided in the second case portion 42. The case 40 is further provided with a side wall portion S1 that is located on the axial first side L1 relative to the rotating electric machine 6. The side wall portion 51 separates the rotating-electric-machine accommodation chamber S1 and the transfer accommodation chamber S3 from each other in the axial direction L. According to the present embodiment, the side wall portion 51 is provided in the first case portion 41. The side wall portion 51 is formed to extend toward the radially inner side R2 from a peripheral wall portion 50 that is a portion of the case 40 (specifically, the first case portion 41) and that surrounds the rotating electric machine 6 from the radially outer side R1. According to the present embodiment, the side wall portion 51 is formed as one piece with the peripheral wall portion 50. A tubular portion 52 that has a tubular shape and that extends in the axial direction L is connected to a center portion (i.e., an end portion on the radially inner side R2) of the side wall portion 51 in the radial direction R. The tubular portion 52 is formed as one piece with the side wall portion 51.

As illustrated in FIG. 3, the case 40 is provided with a support member 45, between the rotating electric machine 6 and the end wall portion 53 in the axial direction L. According to the present embodiment, the support member 45 is provided to the first case portion 41. According to the present embodiment, the support member 45 is a separate piece from the peripheral wall portion 50, is located on the radially inner side R2 relative to the peripheral wall portion 50, and is integrally jointed to the peripheral wall portion 50. The support member 45 is fixed by using a fixation member 44 (here, a fastening bolt) to the peripheral wall portion 50 or to a member fixed to the peripheral wall portion 50. The speed reducer 83 is located between the support member 45 (specifically, a portion of the support member 45 extending toward the radially outer side R1 from a portion of the support member 45 to which a first bearing 91 that is described later is attached) and the end wall portion 53 in the axial direction L.

According to the present embodiment, the rotating electric machine 6 is supported on the first case portion 41 in a manner described below. The stator core 62 is fixed to the first case portion 41 by using a stator fixation member 67 (here, a fastening bolt). The rotor shaft 25 having the rotor 60 fixed thereto is supported on the first case portion 41 (specifically, the support member 45) via the first bearing 91 (here, a ball bearing) that is located on the axial second side L2 relative to the rotor 60. A through hole that extends through the support member 45 in the axial direction L is formed in a central portion of the support member 45 in the radial direction R, and the first bearing 91 is located between the inner circumferential surface of the through hole and the outer circumferential surface of the rotor shaft 25 in the radial direction R. Further, the rotor shaft 25 is supported on the first case portion 41 (specifically, the tubular portion 52) via a second bearing 92 (here, a ball bearing) that is located on the axial first side L1 relative to the rotor 60. The second bearing 92 is located between the inner circumferential surface of the tubular portion 52 and the outer circumferential surface of the rotor shaft 25 in the radial direction R. Further, the coupling member 26 is supported on the first case portion 41 (specifically, the tubular portion 52) via a third bearing 93 (here, a ball bearing) that is located on the axial first side L1 relative to the second bearing 92.

According to the present embodiment, the intermediate member 24 is supported on the first case portion 41 in a manner described below. As described above, the intermediate member 24 is located on the radially inner side R2 relative to the rotor shaft 25 and at a location that overlaps the rotor shaft 25 in the radial view. Although not illustrated in the drawings, a bearing (e.g., a bushing) is located between the outer circumferential surface of the intermediate member 24 and the inner circumferential surface of the rotor shaft 25 in the radial direction R. Thus, the intermediate member 24 is supported on the first case portion 41 via the rotor shaft 25.

According to the present embodiment, the speed reducer 83 (the planetary gear mechanism 10) is supported on the first case portion 41 in a manner described below. The ring gear 13 is fixed to the support member 45 of the first case portion 41. Further, a bearing (here, a bushing) is located between the inner circumferential surface of the sun gear 11 and the outer circumferential surface of the intermediate member 24 in the radial direction R. Thus, the sun gear 11 is supported on the first case portion 41 via the intermediate member 24 and the rotor shaft 25. Further, the carrier 12 is fixed (here, fixed by welding) to the intermediate member 24. Thus, the carrier 12 is supported on the first case portion 41 via the intermediate member 24 and the rotor shaft 25.

As illustrated in FIG. 2, the case 40 is provided with an attachment portion 1a that is configured to be attached to a mount 86 fixed to a vehicle body 85. It is noted that FIG. 3 omits the attachment portion 1a. In the example illustrated in FIG. 2, the mount 86 (a rubber mount) is provided with a rubber base and is fixed to a crossmember 85a of the vehicle body 85. The mount 86 or a member (a stay or the like) fixed to the mount 86 is attached using, for example, a fastening bolt to the attachment portion 1a of the case 40 (here, the first case portion 41). According to the present embodiment, an end portion of the case 40 (specifically, the second case portion 42) on the axial second side L2 is coupled to the internal combustion engine 2 so that an end portion of the vehicle drive system 1 on the axial second side L2 is supported on the vehicle body 85 via a mount (not illustrated) that is attached to the internal combustion engine 2. That is, the vehicle drive system 1 is supported on the vehicle body 85 by at least two locations (e.g., only two locations), namely, at a location where the attachment portion 1a is provided and at the end portion on the axial second side L2.

According to the present embodiment, the attachment portion 1a is provided at a location that overlaps the rotating electric machine 6 in the radial view. The attachment portion 1a is located such that part of a circumferential portion thereof overlaps the rotating electric machine 6 in the radial view. In other words, the attachment portion 1a is located such that the arrangement area of the attachment portion 1a overlaps the arrangement area of the rotating electric machine 6 in the axial direction L. A vehicle drive system that is structured by removing the rotating electric machine 6 from the vehicle drive system 1 according to the present embodiment and by providing, an attachment portion to be attached to a mount, to an adapter portion (a portion corresponding to the first case portion 41 of the vehicle drive system 1 according to the present embodiment) that couples the transmission 4 and the transfer 84 together is considered here as an existing vehicle drive system. As described above, in the vehicle drive system 1 according to the present embodiment, the attachment portion 1a is provided at a location that overlaps the rotating electric machine 6 in the radial view. Thus, when the vehicle drive system 1 according to the present embodiment is realized by adding the rotating electric machine 6 to (i.e., by hybridizing) such an existing vehicle drive system, it is not necessary to significantly change the location of the attachment portion 1a from that in the existing vehicle drive system, and for example, the location of the attachment portion 1a may be the same as that in the existing vehicle drive system. This enables the scale of change in the vehicle body 85 to be kept small when the vehicle drive system 1 according to the present embodiment is realized by hybridizing the existing vehicle drive system.

As illustrated in FIG. 3, according to the present embodiment, a rotation sensor 80 that detects the rotation of the rotor 60 is located between the rotor 60 and the speed reducer 83 in the axial direction L. According to the present embodiment, the rotation sensor 80 is a resolver, and the rotation sensor 80 is provided with a sensor stator fixed to the case 40 (specifically, the support member 45), and a sensor rotor fixed to the rotor shaft 25. According to the present embodiment, the rotation sensor 80 is located on the radially inner side R2 relative to the stator 61. Specifically, the rotation sensor 80 is located at a location that overlaps the stator 61 (specifically, the second coil end portion 64B) in the radial view. Here, a portion of the rotation sensor 80 on the axial first side L1 is located in such a manner as to overlap the stator 61 in the radial view.

As illustrated in FIG. 3, according to the present embodiment, an axial oil passage 70 that extends in the axial direction L is formed in at least one (in this example, both) of the transmission output member 23 and the intermediate member 24. A portion of the axial oil passage 70 that is formed in the transmission output member 23 is referred herein to as a first axial oil passage 71, and a portion of the axial oil passage 70 that is formed in the intermediate member 24 is referred herein to as a second axial oil passage 72. The first axial oil passage 71 is formed to have an opening facing toward the axial first side L1, and the second axial oil passage 72 is formed to have an opening facing toward the axial second side L2.

According to the present embodiment, a supply portion 74 for supplying oil to the axial oil passage 70 is provided on the axial second side L2 relative to the rotating electric machine 6. According to the present embodiment, the supply portion 74 is provided on the axial second side L2 relative to the speed reducer 83 (the planetary gear mechanism 10). The supply portion 74 herein is formed by a hole portion that is formed to extend through a cylindrical portion of the transmission output member 23 in the radial direction R, and the cylindrical portion is located on the axial second side L2 relative to the speed reducer 83 (the planetary gear mechanism 10). The supply portion 74 is formed to have an opening in the inner circumferential surface of the cylindrical portion and thus communicates with the first axial oil passage 71 at an end portion thereof on the radially inner side R2. A hydraulic pressure that has been controlled by the hydraulic control device 8 (refer to FIG. 2) is supplied to the first axial oil passage 71 by first passing through a supply oil passage 73 formed in the end wall portion 53 and then through the supply portion 74. The oil supplied from the supply portion 74 to the first axial oil passage 71 flows toward the axial first side L1 and is then supplied to the second axial oil passage 72.

A discharge portion 75 is formed in the intermediate member 24 to discharge the oil in the second axial oil passage 72 toward the radially outer side R1 relative to the intermediate member 24. The discharge portion 75 is formed by a hole portion that extends through the intermediate member 24 in the radial direction R. The oil discharged from the discharge portion 75 toward the radially outer side R1 relative to the intermediate member 24 is guided by a cooling oil passage in the rotating electric machine 6 and is used to cool the rotating electric machine 6. According to the present embodiment, a sealing member 95 is provided between the inner circumferential surface of the tubular portion 52 and the outer circumferential surface of the transfer input member 27 to seal a clearance between the inner circumferential surface of the tubular portion 52 and the outer circumferential surface of the transfer input member 27. Thus, the rotating-electric-machine accommodation chamber S1 and the transfer accommodation chamber S3 are separated from each other in an oil-tight manner. In the example illustrated in FIG. 3, the sealing member 95 is located on the axial first side L1 relative to the third bearing 93. Separating the rotating-electric-machine accommodation chamber S1 and the transfer accommodation chamber S3 from each other in an oil-tight manner in this way enables the transmission 4 and the rotating electric machine 6 to share oil in the case 40 while enabling the transfer 84 to use a different type of oil.

According to the present embodiment, the rotating-electric-machine accommodation chamber S1 and the transmission accommodation chamber S2 communicate with each other in a manner that allows oil to circulate therebetween. That is, according to the present embodiment, the rotating-electric-machine accommodation chamber S1 and the transmission accommodation chamber S2 are not separated from each other in an oil-tight manner. According to the present embodiment, as described above, the rotating-electric-machine accommodation chamber S1 and the transmission accommodation chamber S2 are structured to communicate with each other so that the transmission 4 and the rotating electric machine 6 share the oil in the case 40. For example, when the oil storing portion is provided under the transmission accommodation chamber S2, the following structure may be used: oil supplied to the rotating-electric-machine accommodation chamber S1 through the axial oil passage 70 returns to the transmission accommodation chamber S2 through an oil passage that causes the rotating-electric-machine accommodation chamber S1 and the transmission accommodation chamber S2 to communicate with each other.

On the other hand, according to the present embodiment, the rotating-electric-machine accommodation chamber S1 and the transfer accommodation chamber S3 are separated from each other in an oil-tight manner. In other words, according to the present embodiment, the rotating-electric-machine accommodation chamber S1 and the transfer accommodation chamber S3 do not communicate with each other. According to the present embodiment, as described above, the rotating-electric-machine accommodation chamber S1 and the transfer accommodation chamber S3 are separated from each other in an oil-tight manner, and different oils (specifically, different types of oils) are used in the transfer accommodation chamber S3 and in both the rotating-electric-machine accommodation chamber S1 and the transmission accommodation chamber S2. That is, according to the present embodiment, the oil in the transfer accommodation chamber S3 is different (specifically, different in type) from the oil in both the rotating-electric-machine accommodation chamber S1 and the transmission accommodation chamber S2. The oil in the transfer accommodation chamber S3 is used for purposes including lubrication of the transfer 84.

Other Embodiments

Next, other embodiments of the vehicle drive system are described.

(1) According to the example of the structure described in the above embodiment, the attachment portion 1a is provided at a location that overlaps the rotating electric machine 6 in the radial view. However, the present disclosure is not limited to such a structure, and the attachment portion 1a may be provided at a location that does not overlap the rotating electric machine 6 in the radial view (for example, at a location that overlaps the transfer 84 in the radial view).

(2) According to the example of the structure described in the above embodiment, the speed reducer 83 is located coaxially with the transmission output member 23, between the transmission 4 and the rotating electric machine 6 in the axial direction L. However, the present disclosure is not limited to such a structure, and, for example, the speed reducer 83 may be located coaxially with the transmission output member 23, between the rotating electric machine 6 and the transfer 84 in the axial direction L.

(3) According to the example of the structure described in the above embodiment, the vehicle drive system 1 is provided with the speed reducer 83 that decelerates rotation transmitted from the rotating electric machine 6 and that transmits the decelerated rotation toward the transmission output member 23. However, the present disclosure is not limited to such a structure, and the vehicle drive system 1 may not be provided with the speed reducer 83 (for example, rotation of the rotating electric machine 6 is transmitted to the intermediate member 24 while the rotational speed remains unchanged).

(4) According to the example of the structure described in the above embodiment, the transfer 84 is capable of stepwise changing a ratio between the speed of rotation that is transmitted from the transmission output member 23 and the speed of rotation that is distributed between the first output member 21A and the second output member 21B. However, the present disclosure is not limited to such a structure, and, for example, the transfer 84 may be structured to be incapable of changing the ratio (for example, in the example described in the above embodiment, the transfer 84 may be structured without the speed change portion 100).

(5) According to the example of the structure described in the above embodiment, the planetary gear mechanism 10 is provided with the sun gear 11 that is coupled to the rotating electric machine 6, the carrier 12 that is coupled to the intermediate member 24, and the ring gear 13 that is fixed to the first case portion 41. However, the present disclosure is not limited to such a structure, the planetary gear mechanism 10 may be provided with the sun gear 11 that is fixed to the first case portion 41, the carrier 12 that is coupled to the intermediate member 24, and the ring gear 13 that is coupled to the rotating electric machine 6. Further, a double-pinion-type planetary gear mechanism may be used as the planetary gear mechanism 10, and in this case, the planetary gear mechanism 10 may be provided with the sun gear 11 that is coupled to the rotating electric machine 6, the carrier 12 that is coupled to the first case portion 41, and the ring gear 13 that is coupled to the intermediate member 24, or the planetary gear mechanism 10 may be provided with the sun gear 11 that is fixed to the first case portion 41, the carrier 12 that is coupled to the rotating electric machine 6, and the ring gear 13 that is coupled to the intermediate member 24.

(6) It is noted that, as long as there is no inconsistency, the structure disclosed in any of the embodiments described above may be used in combination with the structure disclosed in others of the embodiments (including the combinations of the embodiments described as other embodiments). Also for other structures, the embodiments disclosed in this description are to be considered in all aspects as illustrative only. Therefore, various modifications that fall within the spirit of the present disclosure are possible as appropriate.

SUMMARY OF THE ABOVE EMBODIMENTS

The vehicle drive system described above is summarized below.

A vehicle drive system (1) is provided with: an input member (20) drivingly coupled to an internal combustion engine (2); a transmission (4) that changes a speed of rotation transmitted from the input member (20) side and that then transmits the rotation to a transmission output member (23); a rotating electric machine (6) drivingly coupled to the transmission output member (23); a first output member (21A) drivingly coupled to a rear wheel (3A); a second output member (21B) drivingly coupled to a front wheel (3B); a transfer (84) that distributes the rotation transmitted from the transmission output member (23) between the first output member (21A) and the second output member (21B), and a case (40) that houses the transmission (4), the rotating electric machine (6), and the transfer (84), wherein the transfer (84) is located on an axial first side (L1) relative to the transmission (4), the axial first side (L1) being one side in axial direction (L), and the rotating electric machine (6) is located coaxially with the transmission output member (23), between the transmission (4) and the transfer (84) in the axial direction (L).

This structure enables the rotating electric machine (6) to be located close to the transmission (4), compared with when the rotating electric machine (6) is located on the axial first side (L1) relative to the transfer (84). Thus, when components that are needed to supply oil, such as a hydraulic pump and an oil storing portion, are shared at least in part between the transmission (4) and the rotating electric machine (6) and oil in the case (40) is shared between the transmission (4) and the rotating electric machine (6), it is possible to easily simplify the structure of an oil passage, for example, it is possible to easily keep the oil passage to a short length. Therefore, it is possible to easily simplify a structure for supplying oil to the transmission (4) and the rotating electric machine (6).

It is preferable here that the case (40) be provided with a transmission accommodation chamber (S2) that houses the transmission (4), and a rotating-electric-machine accommodation chamber (S1) that houses the rotating electric machine (6), and that the transmission accommodation chamber (S2) and the rotating-electric-machine accommodation chamber (S1) be located adjacent to each other in the axial direction (L).

This structure enables an oil passage for circulating oil between the transmission accommodation chamber (S2) and the rotating-electric-machine accommodation chamber (S1) to be formed relatively simply by using a wall that separates the transmission accommodation chamber (S2) and the rotating-electric-machine accommodation chamber (S1) from each other. Thus, when oil in the case (40) is shared between the transmission (4) and the rotating electric machine (6), it is possible to more easily simplify the structure of an oil passage, and therefore, it is possible to further simplify the structure for supplying the oil to the transmission (4) and the rotating electric machine (6).

When the transmission accommodation chamber (S2) and the rotating-electric-machine accommodation chamber (S1) are located adjacent to each other in the axial direction (L), it is preferable that the case (40) be provided with a transfer accommodation chamber (S3) that houses the transfer (84), that the rotating-electric-machine accommodation chamber (S1) and the transmission accommodation chamber (S2) communicate with each other in a manner that allows oil to circulate between the rotating-electric-machine accommodation chamber (S1) and the transmission accommodation chamber (S2), and that the rotating-electric-machine accommodation chamber (S1) and the transfer accommodation chamber (S3) be separated from each other in an oil-tight manner.

This structure enables the transmission (4) and the rotating electric machine (6) to appropriately share the oil in the case (40) using a portion communicating between the rotating-electric-machine accommodation chamber (S1) and the transmission accommodation chamber (S2) (e.g., an oil passage communicating therebetween), while keeping the oil in the rotating-electric-machine accommodation chamber (S1) from flowing into the transfer accommodation chamber (S3).

When the rotating-electric-machine accommodation chamber (S1) and the transmission accommodation chamber (S2) communicate with each other in a manner that allows oil to circulate therebetween, and the rotating-electric-machine accommodation chamber (S1) and the transfer accommodation chamber (S3) are separated from each other in an oil-tight manner, as described above, it is preferable that oil in the transfer accommodation chamber (S3) be different from the oil in the rotating-electric-machine accommodation chamber (S1) and the transmission accommodation chamber (S2).

This structure easily enables the oil in the rotating-electric-machine accommodation chamber (S1) and the transmission accommodation chamber (S2) to be oil having properties suitable for (properties required for) the rotating electric machine (6) and the transmission (4) while enabling the oil in the transfer accommodation chamber (S3) to be oil having properties suitable for (properties required for) the transfer (84).

Further, it is preferable that driving power of the rotating electric machine (6) be transmitted to an intermediate member (24) that is provided in a power transmission path between the transmission output member (23) and the transfer (84), that an axial oil passage (70) extending in the axial direction (L) is formed in at least one of the transmission output member (23) and the intermediate member (24), and that a supply portion (74) that supplies oil to the axial oil passage (70) is provided on an axial second side (L2) relative to the rotating electric machine (6), the axial second side (L2) being opposite to the axial first side (L1) in the axial direction (L).

This structures enables an oil passage for supplying oil from the transmission accommodation chamber (S2) to the rotating-electric-machine accommodation chamber (S1) to be formed by using the axial oil passage (70), when the oil in the case (40) is shared between the transmission (4) and the rotating electric machine (6).

Further, it is preferable that the case (40) be provided with an attachment portion (1a) that is configured to be attached to a mount (86) fixed to a vehicle body (85), and that the attachment portion (1a) be provided at a location that overlaps the rotating electric machine (6) in a radial view along a radial direction (R).

This structure enables the case (40) to be supported on the vehicle body (85) at a location close to the rotating electric machine (6) that may cause torsional vibration in a drive train, compared with when the attachment portion (1a) is provided at a location that does not overlap the rotating electric machine (6) in the radial view. Thus, torsional vibration in a drive train is reduced, and vitiation of the vehicle body (85) that is caused by the torsional vibration is likely to be reduced to a low level.

Further, it is preferable that the transfer (84) be structured to be capable of stepwise changing a ratio between a speed of the rotation that is transmitted from the transmission output member (23) and a speed of the rotation that is distributed between the first output member (21A) and the second output member (21B).

This structure enables a speed ratio between the rotating electric machine (6) and the two output members (21A, 21B)

to be stepwise changed by the transfer (84), when driving power of the rotating electric machine (6) is transmitted to the power transmission path between the transmission output member (23) and the transfer (84). Thus, when the speed ratio between the rotating electric machine (6) and the two output members (21A, 21B) is changed in accordance with, for example, a vehicle speed and required driving power, it is possible to improve efficiency of the rotating electric machine (6) and also to easily provide necessary driving power using the rotating electric machine (6) that is small in size.

Further, it is preferable that driving power of the rotating electric machine (6) be transmitted to an intermediate member (24) that is provided in a power transmission path between the transmission output member (23) and the transfer (84), that the intermediate member (24) is located coaxially with the transmission output member (23), on the axial first side (L1) relative to the transmission (4), that the case (40) be provided with a first case portion (41) that supports the rotating electric machine (6) and the intermediate member (24), and a second case portion (42) that supports the transmission (4) and the transmission output member (23), and that the intermediate member (24) be coupled to the transmission output member (23) while the first case portion (41) is joined to the axial first side (L1) of the second case portion (42).

This structure enables the transmission (4), the transmission output member (23), and the second case portion (42) that supports these to have entirely or almost entirely the same structures, even when specifications of the rotating electric machine (6) are changed. Further, when the rotating electric machine (6) is added to an existing vehicle drive system that is provided with an internal-combustion engine only as a power source to drive wheels in order to hybridize the existing vehicle drive system, it is possible to allow the transmission (4), the transmission output member (23), and a portion corresponding to the second case portion (42) that supports these to have entirely or almost entirely the same structures as in the existing vehicle drive system. Thus, it is possible to provide the vehicle drive system (1) that facilitates changes in the specifications of the rotating electric machine (6) and that facilitates hybridization of the existing vehicle drive system.

Further, it is preferable that a speed reducer (83) that decelerates rotation transmitted from the rotating electric machine (6) and that transmits the decelerated rotation toward the transmission output member (23) be provided, and that the speed reducer (83) be located coaxially with the transmission output member (23), between the transmission (4) and the rotating electric machine (6) in the axial direction (L).

This structure enables output torque of the rotating electric machine (6) to be transmitted toward the transmission output member (23) via the speed reducer (83). Thus, it is possible to drive the rear wheel (3A) and the front wheel (3B) by transmitting rotation of the rotating electric machine (6) that has been decelerated by the speed reducer (83), to the first output member (21A) and the second output member (21B), and therefore, it is easy to provide necessary driving power.

Achieving at least one of the effects described above fulfils the requirements of a vehicle drive system according to the present disclosure.

DESCRIPTION OF THE REFERENCE NUMERALS

1: VEHICLE DRIVE SYSTEM
1a: ATTACHMENT PORTION
2: INTERNAL COMBUSTION ENGINE
3A: REAR WHEEL
3B: FRONT WHEEL
4: TRANSMISSION
6: ROTATING ELECTRIC MACHINE
20: INPUT MEMBER
21A: FIRST OUTPUT MEMBER
21B: SECOND OUTPUT MEMBER
23: TRANSMISSION OUTPUT MEMBER
24: INTERMEDIATE MEMBER
40: CASE
41: FIRST CASE PORTION
42: SECOND CASE PORTION
70: AXIAL OIL PASSAGE
74: SUPPLY PORTION
83: SPEED REDUCER
84: TRANSFER
85: VEHICLE BODY
86: MOUNT
L: AXIAL DIRECTION
L1: AXIAL FIRST SIDE
L2: AXIAL SECOND SIDE
R: RADIAL DIRECTION
S1: ROTATING-ELECTRIC-MACHINE ACCOMMODATION CHAMBER
S2: TRANSMISSION ACCOMMODATION CHAMBER
S3: TRANSFER ACCOMMODATION CHAMBER

The invention claimed is:

1. A vehicle drive system provided with:
an input member drivingly coupled to an internal combustion engine;
a transmission that changes a speed of rotation transmitted from the input member and that then transmits the rotation to a transmission output member;
a rotating electric machine drivingly coupled to the transmission output member;
a first output member drivingly coupled to a rear wheel;
a second output member drivingly coupled to a front wheel;
a transfer that distributes the rotation transmitted from the transmission output member between the first output member and the second output member; and
a case that houses the transmission, the rotating electric machine, and the transfer, wherein
the transfer is located on an axial first side relative to the transmission, the axial first side being one side in an axial direction,
the rotating electric machine is located coaxially with the transmission output member, between the transmission and the transfer in the axial direction,
the case is provided with a transmission accommodation chamber that houses the transmission, a rotating-electric-machine accommodation chamber that houses the rotating electric machine, and a transfer accommodation chamber that houses the transfer,
the transmission accommodation chamber and the rotating-electric-machine accommodation chamber are located adjacent to each other in the axial direction,
the case is provided with a side wall portion that is located on the axial first side relative to the rotating electrical machine, and
the side wall portion separates the rotating-electric-machine accommodation chamber and the transfer accommodation chamber from each other in the axial direction.

2. The vehicle drive system according to claim 1, wherein
the rotating-electric-machine accommodation chamber and the transmission accommodation chamber communicate with each other in a manner that allows oil to circulate between the rotating-electric-machine accommodation chamber and the transmission accommodation chamber, and
the rotating-electric-machine accommodation chamber and the transfer accommodation chamber are separated from each other in an oil-tight manner.

3. The vehicle drive system according to claim 2, wherein oil in the transfer accommodation chamber is different from the oil in the rotating-electric-machine accommodation chamber and the transmission accommodation chamber.

4. The vehicle drive system according to claim 1, wherein
driving power of the rotating electric machine is transmitted to an intermediate member that is provided in a power transmission path between the transmission output member and the transfer,
an axial oil passage extending in the axial direction is formed in at least one of the transmission output member and the intermediate member, and
a supply portion that supplies oil to the axial oil passage is provided on an axial second side relative to the rotating electric machine, the axial second side being opposite to the axial first side in the axial direction.

5. The vehicle drive system according to claim 1, wherein
the case is provided with an attachment portion that is configured to be attached to a mount fixed to a vehicle body, and
the attachment portion is provided at a location that overlaps the rotating electric machine in a radial view along a radial direction.

6. The vehicle drive system according to claim 1, wherein the transfer is structured to be capable of stepwise changing a ratio between a speed of the rotation that is transmitted from the transmission output member and a speed of the rotation that is distributed between the first output member and the second output member.

7. The vehicle drive system according to claim 1, wherein
driving power of the rotating electric machine is transmitted to an intermediate member that is provided in a power transmission path between the transmission output member and the transfer,
the intermediate member is located coaxially with the transmission output member, on the axial first side relative to the transmission,
the case is provided with a first case portion that supports the rotating electric machine and the intermediate member, and a second case portion that supports the transmission and the transmission output member, and
the intermediate member is coupled to the transmission output member while the first case portion is joined to the axial first side of the second case portion.

8. The vehicle drive system according to claim 1, further provided with:
a speed reducer that decelerates rotation transmitted from the rotating electric machine and that transmits the decelerated rotation toward the transmission output member, wherein
the speed reducer is located coaxially with the transmission output member, between the transmission and the rotating electric machine in the axial direction.

* * * * *